United States Patent Office 3,705,977
Patented Dec. 12, 1972

3,705,977
ATTITUDE CONTROL SYSTEM
Kent R. Folgate, Phoenixville, Pa., assignor to
General Electric Company
Filed Oct. 14, 1970, Ser. No. 80,582
Int. Cl. G05d *1/08;* G06f *15/50*
U.S. Cl. 235—150.25      4 Claims

ABSTRACT OF THE DISCLOSURE

Given data representative of existing and desired orientation of freely rotatable body, unique axis is determined around which a single rotation no greater than a straight angle will move body to desired orientation. Components of angular velocity arbitrarily proportional to components of unique axis are substracted from existing components of angular velocity of body, and change in body angular momentum corresponding to these is calculated. Control means (e.g., control gyroscopes) are controlled responsively to calculated result to contribute components of required angular momentum change.

BACKGROUND OF THE INVENTION

(1) Field of the invention

This invention pertains to the art of orienting bodies free to rotate in any direction by the application to them of controlled torques.

(2) Description of the prior art

The conventional way of attempting to orient, by automatic means, a body free to rotate in any direction has been to provide torquing devices (which may be momentum storage devices such as flywheels driven by continuously controllable motors) which produce torque about a given axis, and to drive such a device in direction and with an amplitude proportionate to the angular difference about the axis between the desired orientation and the orientation determined by automatic sensing devices. In other words, the rotation about each orthogonal axis is treated independently of that about any of the other axes. This has been found empirically to result in errors in moving to the desired attitude. While the problem has been attacked by empirical modifications of the system characteristics, these have all been ad hoc, and their results only approximate the desired one.

SUMMARY OF THE INVENTION

It may be shown that, if a body free to rotate in any direction has an existing orientation which differs from the desired orientation, there exists a single unique axis such that a single rotation of the body around that axis, no greater than a straight angle (or 180 degrees), will alter the body's orientation from the existing to the desired one. Since this rotation will (except in the case where its magnitude is exactly a straight angle) have a single sign, or determinate direction, a sign may be given to the unique axis which is indicative of the direction of the required angular rotation. (This sign may be assigned in conventional fashion as the direction in which a right-handed screw will advance if rotated in the direction of the required rotation.) A rotation $u$ around the unique axis, having no components of rotation normal to the unique axis, will alter the body orientation, with minimum angular travel, to the desired one. However, in practice the body may already be rotating in some direction other than this ideal one; and it may well be that the available means for altering the body's angular velocity will not suffice to eliminate the components of angular velocity normal to the unique axis in negligible time; that is, it is in general not feasible to suddenly stop all rotation of the body except in the required direction. I have found that the body attitude will converge to the desired attitude provided only that the vector representing the body's angular velocity lies in the same hemisphere as the unique axis. This may be expressed alternatively by saying that the body attitude will converge to the desired attitude if there is a component of its angular velocity which is along the unique axis and has the same sense (or, alternatively, sign) as the unique axis. The importance of this finding is that it indicates that any existing means for altering the angular velocity of the body will contribute effectively to cause it to turn to its desired attitude if it contributes to the desired component of rotation, even if it also contributes components of rotation normal to the unique axis, and even if other means also contribute to the desired component of rotation. A vector collinear with the unique axis, which is: positive for $u$ between, but not including, $-180°$ and zero; zero for $u$ equal to zero; negative for $u$ between, but not including, zero and $+180°$; non-zero for $u$ equal to $+180°$; which is continuous around $u$ equal to zero; which has odd symmetry, i.e., $f(-u)=f(u)$; and is a single-valued function of $u$; is applicable to define how to apply usefully the means for altering body rotation. I have named a vector meeting these constraints the "policy" vector.

Since the change of angular velocity of a physical body requires a change in its angular momentum, and since the general case requires consideration of the fact that bodies are in general not centrally symmetrical, but have different moments of inertia around different axes, it is desirable in applying the policy vector to derive from it a statement of the angular momentum which it is desirable to produce in order to achieve the desired component of angular velocity parallel to the policy vector. For a body not centrally symmetrical, the vector representing such desired angular momentum will in general not be parallel to the policy vector. When the means for altering the body's angular momentum are devices, such as control gyroscopes, which have stored in them a constant magnitude of angular momentum whose direction may be altered controllably, their use may be simplified by controlling them so that they provide a component of angular momentum along and of the same sign as the desired angular momentum vector. This avoids the complication of calculating the reaction torques produced by rotating such control gyroscopes in their gimbals, and further calculating the contribution of such reaction torques to rotating the body. A similar simplification results if fixed flywheels of controllable speed are employed.

The policy vector is not, dimensionally, a velocity. But it is desirable in practical application of my invention to convert this vector into an angular velocity, which is done by multiplying it by a constant, arbitrary but chosen from system considerations, which has the dimension of time$^{-1}$. By determining the difference between this "policy angular velocity" and the existing angular velocity of the body, one finds the net change objective in body angular velocity; and by multiplying the components of this net change objective by appropriate constants representative of the body moments and products of inertia, one obtains the components of the change objective in body angular momentum. The term "objective" is here employed to indicate the change which is aimed at, even though the available means may not suffice to achieve it immediately.

The significance of my invention, as here described, as contrasted with the prior art, is that it deals with the body motion as a whole, in accordance with a single guiding criterion. Many prior art systems have dealt separately with angular displacements around given (usually orthogonal) axes; these systems fail in many instances because, while angular displacements around a central point may be represented by directed lines, the sum of such displacements obtained by conventional vector addition is not the resulting displacement (which the systems assume it to be). Other prior art systems are based upon design for effective functioning within a comparatively narrow range of displacements over which the system is linearly responsive, but depend upon purely empirical tinkering to create a system which may be hoped (not always with ultimate justification) to function for larger displacements also.

DESCRIPTION OF THE PREFERRED EMBODIMENT

Figure 1:
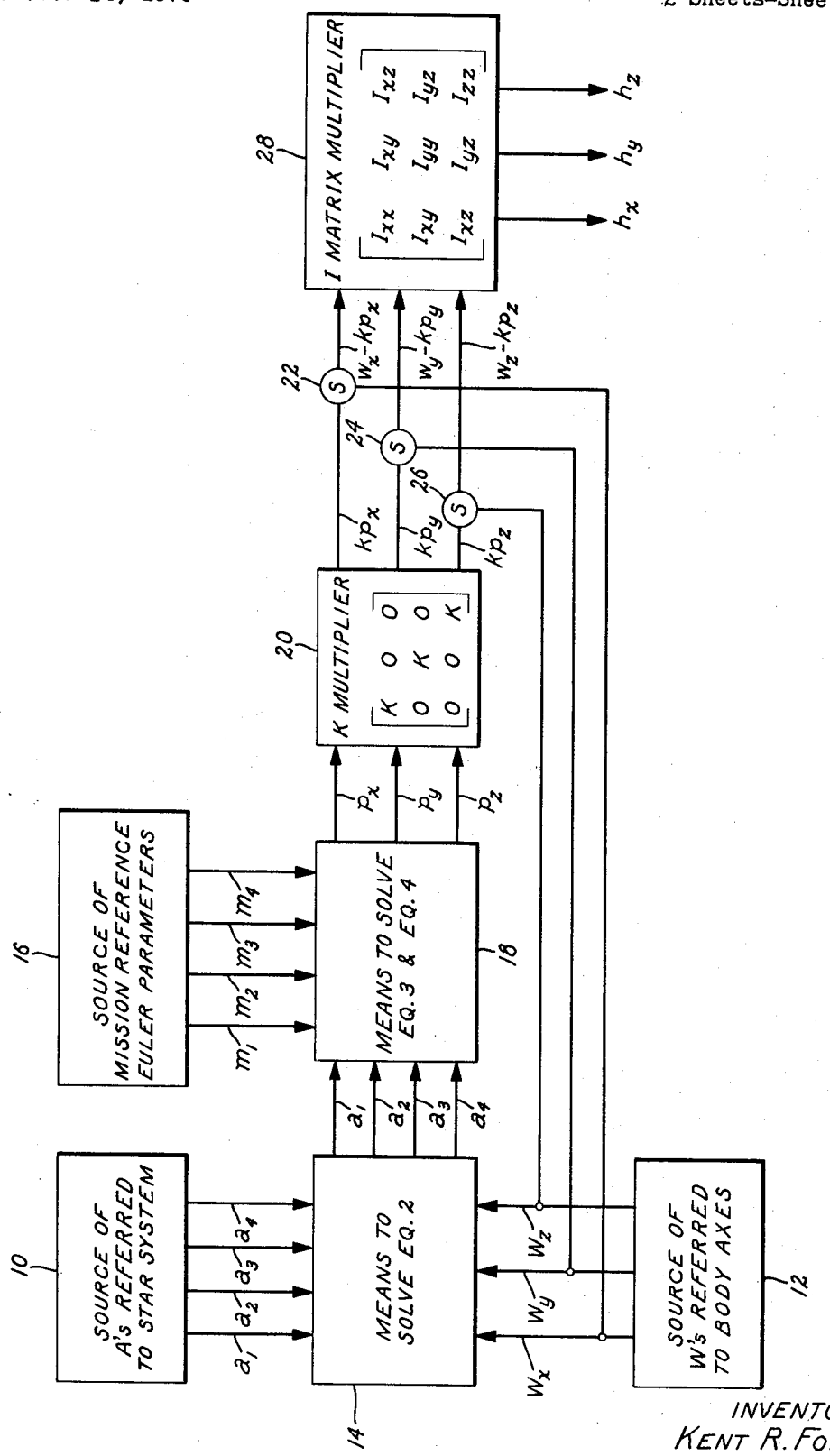
FIG. 1 represents schematically the means for calculating the change in angular momenta required to correct the attitude of the body.

The function of the present invention is control of the angular position, or attitude, of a rigid body around its center of mass, with no consideration of the translation which such a center may simultaneously be undergoing. This attitude may be described by three orthogonal axes in the body, referred to three orthogonal reference axes which have a one-to-one correspondence to the three axes in the body; that is, if the three axes in the body are respectively $i_1$, $i_2$, and $i_3$ and the reference axes are respectively $j_1$, $j_2$, and $j_3$, then the body axes are aligned with the reference axes only if $i_1$ is aligned with $j_1$, $i_2$ with $j_2$, and $i_3$ with $j_3$; the body axes are not aligned with reference axes if, for example $i_1$ is aligned with $j_2$, $i_2$ with $j_3$, and $i_3$ with $j_1$, since, despite the fact that each body axis is aligned with a reference axis, the one-to-one relation does not exist—corresponding axes are not aligned.

The reference axes may be inertially determined (and thus capable of being considered as "fixed" in space); or they may be representative of the desired orientation of the body, as distinguished from its actual orientation which is represented by the body axes. Assuming the latter situation, the question arises how the body may be moved to cause the body axes to coincide with the reference axes. It may be shown that, for any relative position between the body and the reference axes, they may be made to coincide by a single rotation around a unique axis, through an angle $u$. If the unit orthogonal components of the unique axis are the components $b_1$, $b_2$, $b_3$, it is convenient mathematically and part of my preferred embodiment that the attitude of the body is expressed (with respect to the reference axes) by the Euler parameters $$\begin{bmatrix} e_1 \\ e_2 \\ e_3 \\ e_4 \end{bmatrix} = \begin{bmatrix} b_1 \sin \frac{u}{2} \\ b_2 \sin \frac{u}{2} \\ b_3 \sin \frac{u}{2} \\ \cos \frac{u}{2} \end{bmatrix}$$

Eq. 1

The calculation of these parameters is well within the conventional scope of automatic computation, given information on the attitude of the body.

Since my invention is particularly useful in the control of the attitude of bodies moving in space, the basic references with respect to which the body attitude is measured will be inertial, or those of the solar system. Instruments such as infrared sensors and star trackers provide measurements referred to the solar system; and gyroscopic sensors of rates of rotation can furnish interim information both of rates of rotation and, by integration with respect to time, of total angular excursion. But these references are not subject to adjustment; and it is part of my invention that it provides means for controlling the attitude of a body with respect to an arbitrarily determined reference which may vary at the will of the operator. Therefore I provide means to employ the indications from instruments such as those previously mentioned to measure body attitude, but to control the body attitude with respect to a different set of reference axes, which may be called mission axes since they will be determined to meet the needs of a mission to be performed. These mission axes may be stored by conventional computer store techniques in the body to be controlled; or they may be provided by telemetry to the body; or, if they are time variant in a predetermined manner, they may be produced by a function generator controlled by a clock source.

The Euler parameters referred to the inertial (or star system or "fixed") reference axes may initially be predetermined by starting the rate gyros and starting the required computer operating while the body is in a known attitude; i.e., before it is launched. The inertial Euler parameters may be designated as $a_1$, $a_2$, $a_3$, and $a_4$, where the last term is the cosine term. These parameters may be kept current with changes in the body attitude by continually (or continuously) integrating the differential equation $$\frac{d}{dt}\begin{bmatrix} a_1 \\ a_2 \\ a_3 \\ a_4 \end{bmatrix} = \frac{1}{2} \begin{bmatrix} 0 & w_z & -w_y & w_x \\ -w_z & 0 & w_x & w_y \\ w_y & -w_x & 0 & w_z \\ -w_x & -w_y & -w_z & 0 \end{bmatrix} \begin{bmatrix} a_1 \\ a_2 \\ a_3 \\ a_4 \end{bmatrix}$$

Eq. 2 where the $w$'s are components of angular velocity referred to body axes. The mission reference, obtained from the sources suggested previously, may be expressed also as Euler parameters $m_1$, $m_2$, $m_3$, and $m_4$. These, with the inertial parameters, give the $e$'s which express the attitude of the body with respect to the mission reference by the following equation.

$$\begin{bmatrix} e_1 \\ e_2 \\ e_3 \\ e_4 \end{bmatrix} = \begin{bmatrix} a_4 & a_3 & -a_2 & a_1 \\ -a_3 & a_4 & a_1 & a_2 \\ a_2 & -a_1 & a_4 & a_3 \\ -a_1 & -a_2 & -a_3 & a_4 \end{bmatrix} \begin{bmatrix} m_1 \\ m_2 \\ m_3 \\ m_4 \end{bmatrix}$$

Eq. 3

It may be shown that the vector $$\begin{bmatrix} p_x \\ p_y \\ p_z \end{bmatrix} = -2 \begin{bmatrix} e_1 \\ e_2 \\ e_3 \end{bmatrix} \text{sign}(e_4) = p(u)\bar{b} = \bar{p}$$

Eq. 4 has the peculiar and useful property that as long as the angular velocity vector of the body lies in the hemisphere whose zenith includes $\bar{p}$, the rotation will tend to correct the error in attitude of the body with respect to the mission reference. It will be noted that the Euler parameter $e_4$ serves the sole purpose of eliminating the ambiguity which would otherwise exist in determining which hemisphere should be chosen. (The other components which are all multiplied by $\sin u/2$ have the virtue for control purposes that they are monotone single-valued functions of the angle over the entire range of interest.)

The vector $\bar{p}$ has been named the "policy" vector because it determines generally what the policy should be for directing the vehicle angular velocity for all attitude correction. As was indicated in the Description of the Invention, from a physical point of view one does not primarily alter a body's angular velocity; so far as the magnitude of effort is concerned, one alters the angular momentum; and it is the change in angular momentum which must be considered in determining control system characteristics.

The existing body angular velocity vector, obtainable from gyro sensors, may be designated as $\overline{w}$. The inertia matrix which describes the moments and products of inertia of the body may be designated as $\overline{I}$. Then the existing angular momentum of the body itself will be $\overline{Iw}$, to which, to describe the total system angular momentum there must be added the angular momentum $\overline{h}$ of rotating parts in the body. The desired angular velocity $\overline{w}_d$ may, in the simplest case, be a scalar multiple of the policy vector $\overline{p}$, and be written as $\overline{w}_d = k\overline{p}$. It is then evident that by the foregoing definitions, the existing total system angular momentum will be $\overline{Iw} + \overline{h}$; and to alter the existing body angular velocity to $\overline{w}_d$ there must be a change in the angular momentum of the rotating parts (such as control gyroscopes) to $\overline{h}_d$ so that $$\overline{Iw} + \overline{h} = \overline{Iw}_d + \overline{h}_d \qquad \text{Eq. 5}$$

whence $$\overline{I}(\overline{w} - \overline{w}_d) = \overline{h}_d - \overline{h} = \Delta\overline{h} \qquad \text{Eq. 6}$$

expresses the desired change in the angular momentum of the rotating parts, such as control gyroscopes whose angular momentum is deliberately made adjustable by mounting them adjustably, e.g., in gimbals with torque motors to alter the gimbal orientation.

To determine $\Delta\overline{h}$ the first three components of the policy vector $\overline{p}$ may be multiplied by the scalar $k$ (that is, they are multiplied by the matrix whose diagonal has the value $k$ for each element, and zero for all other elements) and the product components are then subtracted from the corresponding components of body angular velocity as determined by the angular velocity sensors (e.g., rate gyros). The resulting three-component product is multiplied by the body inertia matrix $\overline{I}$. The product of this multiplication is the three components of the desired $\Delta\overline{h}$; or, alternatively expressed, it is the vector $\Delta\overline{h}$.

However, since a common form of control gyroscope is one which is mounted on a single gimbal axis normal to its rotating shaft and fixed with respect to the body, the vector already resolved is more conveniently useful, since a single-gimbal gyroscope can alter its momentum only with respect to certain body axes, and hence can not respond to all components of the $\Delta\overline{h}$ vector.

The description of the preferred embodiment thus far has been without reference to the drawings, because it is the mathematical nature of the operations which the apparatus perform that are of the essence of the invention, and given an understanding of these, the description of the figures may be very straightforward.

FIG. 1 represents schematically and symbolically the means for the execution of the steps described for calculating the components of $\Delta\overline{h}$. Item 10, a source of Euler parameters (A's) referred to the star system may be, in the simplest case, a fixed store of such parameters based upon a known body attitude with respect to the earth at a predetermined launch time, which constitutes knowledge of attitude with respect to our solar system and universe; and it also includes star tracking devices which intermittently throughout the mission take bearings of known stars and provide updated values of the parameters. Such devices are part of the known space art. Item 12, a source of $w$'s referred to axes in the body, may most conveniently be a so-called rate gyro package, in which the torques required to restrain strapped gyroscopes from precession are used as a measure of components of angular velocity. These are also highly conventional parts of the space art. Item 14, a means to solve Equation 2 preceding may be a computer especially designed for this purpose; or, alternatively it may represent a more general purpose computer when programmed to solve the given equations. It receives data signals from Items 10 and 12, and produces as output updated values of the A's, based upon the information from item 12 on how the body is rotating and thus changing their values with time. Item 16 is a source of mission reference Euler parameters which, as has been explained, may be fixed and stored in a conventional computer store, or may be produced as functions, e.g., of time from a function generator controlled by a clock, or may be telemetered to the body and stored temporarily in a computer store until replaced by later transmitted values. These M's or mission parameters and the updated A's from item 14 are fed to item 18, means to solve Equations 3 and 4. Since these equations represent straightforward matrix operations they may be performed readily either by a special computer designed to do just that, or on a time-sharing basis by a general purpose computer programmed to solve them. The result of this operation is the three components of the policy vector, referred to the body axes. These P's are fed into item 20, which multiplies them by a constant multiplier $k$.

The multiplier $k$ is arbitrary in that the system designer chooses its value; but he is, of course, guided by certain considerations in its choice. Since the magnitude of the resultant of $w_x - kp$, $w_y - kp$, and $w_z - kp$ determines the magnitude of the response of the corrective control system, $k$ is in effect a gain parameter in the servo system comprised by the entire stabilization system, and its maximum value will be determined by the desired response characteristics of the system considered as a servo system, in accordance with the known principles of design of such systems. Specifically, this positive constant is chosen to yield satisfactory damping for the linear servo system model that is valid for small values of the angle $u$.

The outputs of item 20, the $k$ multiplier, are fed respectively to subtractors 22, 24, and 26, to which the outputs of item 12 are also fed. Subtractor 22 subtracts $kp_x$ from $w_x$; subtractor 24 subtracts $kp_y$ from $w_y$; and subtractor 26 subtracts $kp_z$ from $w_z$. The resulting differences are fed into I matrix multiplier 28, which performs the matrix multiplication indicated by the matrix drawn in the representation of item 28, in which $I_{xx}$ is the body moment of inertia with respect to the $x$ axis, $I_{xy}$ is the body product of inertia with respect to the $x$ and $y$ planes, and the other symbols have similar meanings as indicated by their subscripts. The result of this multiplication (which may be performed either by having I matrix multiplier 28 as a special unit designed to perform only this particular operation, or on a time sharing basis by programming a general purpose computer to perform this routine operation) is the three components $h_x$, $h_y$, and $h_z$ of the vector $\Delta\overline{h}$ which is the change in angular momentum required to produce the desired alteration in the body's attitude.

Given a single-gimballed control gyroscope whose gimbal axis is fixed with respect to the body, the direction of its angular momentum vector is defined by a single parameter, its angle of rotation about the gimbal axis. A mounting matrix G which transforms the components of $\Delta\overline{h}$ into components with respect to the gyroscope mounting need in fact have only two rows because the gyroscope has no capacity to change angular momentum parallel to its gimbal axis; consequently the matrix row which would provide a component parallel to the gimbal axis may be omitted. The three components of $\Delta\overline{h}$ are multiplied by G, giving two orthogonal components of angular momentum which it is desired the given gyroscope contribute. My preferred way of employing these two items of data is to cause them to apply a torque to the gyroscope in the proper direction to cause it to precess in the proper direction to contribute to the required $\Delta\overline{h}$. It is, of course, the reactions upon the body produced by the application of torque to the gyroscope which produce the alteration in the body's attitude; but operation in terms of angular momentum in accordance with my invention automatically includes the effects of such torques without the necessity of considering them in detail as torques.

Figure 2:
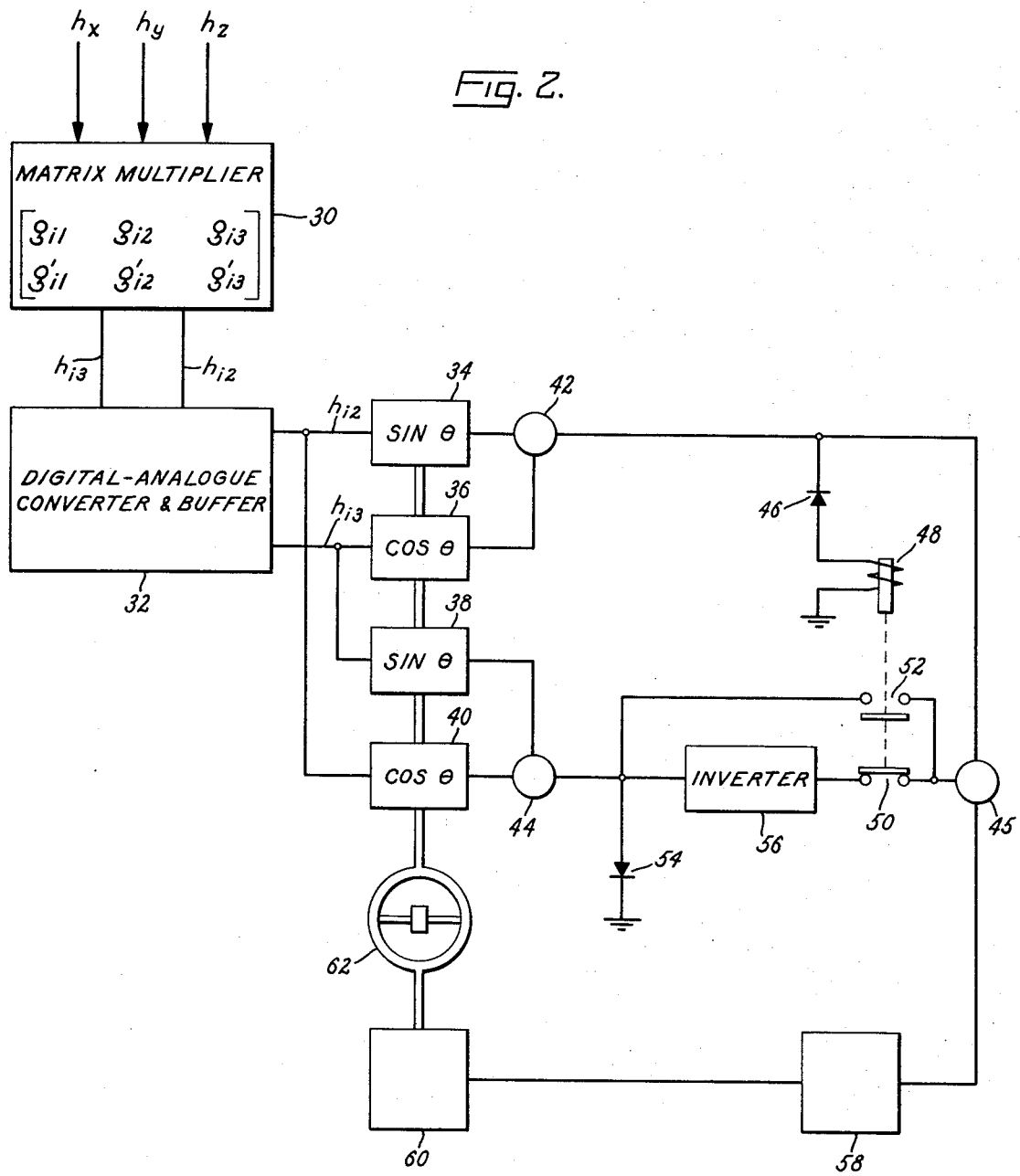
FIG. 2 represents the use of the calculated required change in angular momenta to control the orientation of angular momentum source to provide the required change in angular momenta.

FIG. 2 represents schematically and symbolically the conversion of the components of $\Delta \bar{h}$ into actual control signals suitable for control of a single gimbal axis control gyroscope provided with a permanent field D-C motor, whose direction and magnitude of torque will be determined by the direction and magnitude of current fed to its armature. Since the momentum vector of such a gyroscope can rotate only around its gimabl axis, it is necessary to determine only the two orthogonal components of $\Delta \bar{h}$ which lie in a plane normal to the gimbal axis. This is done by feeding $h_x$, $h_y$, and $h_z$ into matrix multiplier 30 where they are multiplied by the mounting matrix for the particular $i$th control gyroscope under consideration, according to the matrix equation:

$$\begin{bmatrix} g_{i1} & g_{i2} & g_{i3} \\ g'_{i1} & g'_{i2} & g'_{i3} \end{bmatrix} \begin{bmatrix} h_x \\ h_y \\ h_z \end{bmatrix} = \begin{bmatrix} h_{i2} \\ h_{i3} \end{bmatrix}$$

(Eq. 7)

where the G matrix is the so-called mounting matrix of the $i$th gyroscope, and the two elements of the result are orthogonal components of $\Delta h$ lying in the plane normal to the $i$th gyrscope's gimbal axis. This matrix multiplication is performed by means 30, which may be a separate unit designed to perform only that function, or may simply represent a general purpose computer programmed to perform it. These two components (if digital in form) are fed into digital-analogue converter and buffer 32, and appear at the output thereof as analogue voltages proportional in amplitude to and of the same sign as $h_{i2}$ and $h_{i3}$. The actual orientation of the $i$th gyroscope in its gimbal may be represented by the angle $\theta$; and may be taken as zero when the angular momentum vector of the gyroscope coincides with $h_{i2}$. Given this reference, the amplitude of the vector resultant of components $h_{i2}$ and $h_{i3}$ may be designated as $r$, lying at an angle from $h_{i2}$, and one may write $h_{i2} = r \cos \phi$ and $h_{i3} = r \sin \phi$. The real time value of $\theta$ is introduced by four trigonometric potentiometers connected by a common shaft to the gimbal axis of the $i$th gyrscope 62, where 34 and 36 are sine potentiometers and 38 and 40 are cosine potentiometers— that is, the proportion of the potential across their entire windings which appears at the outputs of 34 and 36 is proportional to $\sin \theta$, and the similar proportion appearing at the outputs of 38 and 40 is proportional to $\cos \theta$. Each analogue output from converter-buffer 32 is fed to a $\sin \theta$ potentiometer and to a $\cos \theta$ potentiometer, giving outputs as follows:

Potentiometer:
  34 _____ $\sin \theta \, r \cos \phi$
  36 _____ $\sin \theta \, r \sin \phi$
  38 _____ $\cos \theta \, r \sin \phi$
  40 _____ $\cos \theta \, r \cos \phi$ Subtractor 42 is employed to form $r(\cos \theta \sin \phi - \sin \theta \cos \phi)$ and adder 44 forms $r(\sin \theta \sin \phi + \cos \theta \cos \phi)$, which reduce respectively to $r \sin (\phi - \theta)$ and $r \cos (\phi - \theta)$. The signal representative of $r \sin (\phi - \theta)$ is fed to adder 45, and is also connected to a "negative only" device 46, in practice conveniently a slightly biased diode, which feeds the operating coil 48 of a relay having normally closed contact pair 50 and normally open contact pair 52. The signal representative of $r \cos (\phi - \theta)$ is tied to a "negative only device" 54 which may conveniently be a diode used conventionally as a ground clamp, and is connected to normally open contact pair 42 and to a polarity inverter 54, whose inverted output $-r \cos (\phi - \theta)$ is connected to normally closed contact pair 50. The remaining contacts of both pairs 50 and 52 are connected to adder 45.

The effect of these various devices as interconnected is that the output of adder 44 can have only negative (or zero) values. If the output of subtractor 42 is positive or zero, device 46 will not pass current to operate coil 48, and the output of adder 44 will be inverted by polarity inverter 56 to be positive, and thus pass through normally closed contact pair 50 to adder 45 as a positive polarity to be added to the zero or positive output of subtractor 42. If, however, the output of subtractor 42 is sufficiently negative to cause coil 48 to open contact pair 50 and close contact pair 42, the negative output of adder 44 will pass directly to adder 45, adding to the negative output of subtractor 42.

The practical effect of this arrangement may be described simply, using the usual convention of trigonometry that the first quadrant extends from zero to 90 degrees; the second from 90 to 180 degrees; the third from 180 to 270 degrees, which we may more profitably call $-180$ to $-90$ degrees; and the fourth from 20 to 360 degrees, better described as $-90$ to zero degrees. When $(\phi = \theta)$ is in the first quadrant its sine is postive, and its cosine, being also positive, does not appear in the output of adder 45; when it is in the second quadrant, its sine is still positive so that coil 48 is not energized, and it cosine is negative, passes through polarity inverter 56 and appears positive through normally closed contact pair 50 to contribute to the positive input to adder 45. In particular, as $(\phi - \theta)$ approaches 180 degrees and its sine is approaching zero, its inverted cosine is approaching unity and compensates by its contribution for the diminishing value of the sine. In the third quadrant, the sine becomes negative (as is appropriate in a situation where reducing the magnitude of $(\phi - \theta)$ requires rotation in the opposite direction) and coil 48 is energized through negative-only device 46. The still-negative cosine passes uninverted through normally open, presently closed, contact pair 52, and contributes its negative amplitude to the negative value of the sine. In the fourth quadrant, the cosine, being positive, is suppressed, and only the negative-valued sine appears. To summarize, when the angular difference is of one sign, one polarity of output is produced, and when it is of the other sign, the other polarity of output is produced. In particular, even when the angular difference is nearly a straight angle, a very appreciable output exists thanks to the cosine component; there is no tendency to the electrical equivalent of sticking on dead center.

Continuing the formal description of FIG. 2, the output of adder 45 is fed to a suitable control unit 58 which is essentially a bipolar amplifier which feeds to torque motor 60 of control gyroscope 62 a current proportional in amplitude and sign to the output of adder 45 which control unit 58 receives as an input.

Clearly, it would be possible to apply the digital inputs $h_{i2}$ and $h_{i3}$ to a digital servo system, but the analogue conversion offers some attractive simplicity, and hence is presented as my preferred embodiment.

The description and representations of FIG. 2 pertain to only one control gyroscope, which is incapable of providing angular momentum change parallel to its gimbal axis. In practice, one will employ a plurality of control gyroscopes (or equivalent sources of angular momentum) having various orientations, so that it will always be possible to provide some component of angular momentum change parallel to the desired change. These are no requirements beyond this. Each angular momentum source may be controlled independently of every other one, except for their common inputs of $h_x$, $h_y$, and $h_z$. If one gyroscope should fail, the response will be slower but the remaining control gyroscopes can provide it.

As represented in FIG. 2, matrix multiplier 30 performs a multiplication by a matrix which is peculiar to a given control gyroscope (or to a group of control gyroscopes which are all mounted at identical angles relative to the body axes). Hence, in the most general case, there will be one matrix multipler for every control gyroscope. An alternative to the apparatus layout represented is to convert the signals $h_x$, $h_y$, and $h_z$ to analogue form, and then to apply these analogue values to a matrix multiplier which may be a simple resistive network. In a system which employs a large number of control gyroscopes, this alternative approach may be more economical; but it will require that the analogue signals be supplied through buffers which are capable of furnishing, without objectionable voltage drops which would impair the accuracy of the system, all the currents which the requisite large number of resistive-network analogue matrix multipliers will draw. The particular choice of embodiment will depend upon which alternative is most economical in given circumstances; the performance of the functions required for the practice of my invention will occur by either alternative. Indeed, the means taught in the preferred embodiment as operating digitally may all be analogue devices which perform the same functions; but the preservation of high accuracy in analogue devices generally necessitates extreme precautions in design, as contrasted with digital devices in which higher accuracy may be achieved by simple addition of standard apparatus units (in a parallel machine) or by taking additional time (in a serial machine).

In view of the length of the full description of my invention, it is desirable to summarize it in general terms. The purpose of my invention is an improvement in a system for controlling the angular orientation of a body which is freely rotatable in any direction, the conventional elements of such a system including means for measuring the components of the body's angular velocity around a number of axes fixed with respect to the body, and for giving out signals representative of the components around three mutually orthogonal axes so fixed. Such means are represented by 12 of FIG. 1. Other conventional means similarly included are control gyroscope 62, whose orientation is controllable by torque motor 60 to control the magnitude of the angular momentum component which it provides along given axes. Both of the foregoing are conventional and are employed, in my preferred embodiment, in their conventional manner. The following means, however, while they have all been described in terms of items individually known in the art (since a description in terms of elements not known would hardly be informative), are combined or employed in a manner peculiar to my invention. Referring to FIG. 1, items 10, 12, and 14 cooperate to furnish information of the existing attitude of the body; and 16 furnishes information of the desired attitude of the body. Item 18, which is in itself a standard computation device, receives these two kinds of information and, by solving Equations 3 and 4 preceding, calculates the components, along the mutually orthogonal axes, of a vector collinear with a unique directed axis around which a single angular rotation no more than 180°—a straight angle—will alter the attitude of the body from the existing one to the desired one. Reference item 20, by multiplying these components by an arbitrary constant $k$, calculates the components of an angular velocity of arbitrarily chosen magnitude having the sign and orientation of the angular rotation. The point of including the sign is to insure that the direction of rotation is such that the total angular excursion required to alter the body's orientation from the existing to the desired one will be no more than 180°. Thus, if the total angular excursion required is 90 degrees in one sign, the opposite sign would involve an excursion of 270 degrees, so the consideration of the sign is desirable. Since, however, the body may already have an existing angular rotation, subtractors 22, 24, and 26 are employed for calculating the difference between each component of the angular velocity calculated by 20, and the existing component of body angular velocity collinear with the component of angular velocity calculated by 20, to determine the net required change in each angular velocity component. Since, as has previously been described, it is the change in angular momentum which is to be considered in determining the use of the angular momentum sources, I matrix multiplier 28 is provided to calculate the body angular momentum difference components corresponding to the angular velocity difference components calculated by the use of subtractors 22, 24, and 26. FIG. 2 represents means responsive to the body angular momentum difference components so calculated for controlling angular momentum sources in the body, such as control gyroscope 62, to provide components of angular momentum in the direction of the resultant of the calculated values of body angular momentum difference components.

The operation of the embodiment represented by FIG. 2 may be described in summary to recite that subtractor 42 produces a first control signal which is proportional in amplitude to and has the same sign as the sine of the angle between the existing angular position of control gyroscope 62 and its desired position. This signal is applied, via adder 45 and control unit 58 to torque motor 60, which is a rotator whose torque is proportional in magnitude and direction, respectively, to the magnitude and sign of the control signal applied to it. Adder 44 is a source of a second control signal which is proportional in amplitude to the cosine of the angle between the existing angular position of 62 and its desired position, but only when the cosine is negative, because of the effect of "negative only device" 54. Inverter 56 is sign (or polarity) inversion means connected to receive the second control signal as an input in response to produce as output a third control signal opposite in sign to the second signal. The combination of 46, 48, 50, and 52 constitutes switching means which sample the sign of the first control signal, since if the first control signal is positive no current flows through 46 to operate 48, and normally closed contact pair 50 remains closed, while if the first control signal is negative, current does flow through 46 and 48, opening contact pair 50 and closing pair 52. The net effect of this is that when the second control signal is of the same sign as the first control signal (i.e., negative) closure of contacts 52 causes the second control signal to be connected additively through adder 45 to the first control signal; but when the third control signal is of the same sign as the first control signal, normally closed contacts 50 connect it additively through adder 45 to the first control signal. In either case, the additively connected signals are applied through control unit 58 to rotator 60 to control the magnitude and direction of its torque.

Summarizing still more generally the essence of my invention, it consists of two general means in combination, namely:

Means for calculating the direction of the unique axis around which a single rotation not greater than a straight angle will alter the attitude of the body from an existing one to the desired one; and Means for controlling the available means for altering the angular velocity components of the body so that they alter the body angular rotation so that the body angular rotation, when altered, will have a component along the unique axis, and of the same sense as the unique axis.

The first means are provided by reference items 10 through 18; and the second means are provided by the remainder of the reference items.

I claim:

1. In a system for controlling to a desired attitude the attitude of a body freely rotatable in any direction, provided with controllable means for altering its angular velocity components around axes fixed with respect to the body, the improvement comprising:
   (a) means for calculating the direction of the unique axis around which a single rotation not greater than a straight angle will alter the attitude of the body from an existing one to the desired one; and
   (b) means for controlling the said controllable means to alter the body angular rotation so that the altered body angular velocity will have a component along said unique axis which has the same sense as the unique axis.

2. A system as claimed in claim 1, in which the therein said controllable means for altering the angular velocity components of the body around axes fixed with respect to the body comprise:

(c) sources of angular momentum each controllable to control the magnitude of the angular momentum component which it provides along axes fixed with respect to the body;

further comprising:

(d) means for measuring the components of the angular velocity of the body around a plurality of axes fixed with respect to the body and for producing signals representative of the components of the angular velocity of the body around three mutually orthogonal axes fixed with respect to the body;

calculating means (e) for calculating the components, along the said mutually orthogonal axes fixed with respect to the body, of a vector collinear with the unique directed axis around which a single angular rotation not greater than a straight angle will alter the attitude of the body from the existing one to the desired one;

(f) for calculating the magnitudes, around the said components of the unique axis, of the components of an angular velocity of arbitrarily chosen magnitude having the sign and orientation of the said angle of rotation;

(g) for calculating the difference between each said component of angular velocity of arbitrarily chosen magnitude and the existing component of body angular velocity collinear therewith; and (h) for calculating the body angular momentum difference components corresponding to the angular velocity difference components calculated according to the recital of subparagraph (g); and control means responsive to the calculated values of body angular momentum difference components, for controlling the angular momentum sources in the body recited in (c) to provide components of angular momentum in the direction of the resultant of the said calculated values of body angular momentum difference components.

3. The improvement claimed in claim 2, in which (i) the calculation recited in (e) thereof is performed by the multiplication indicated by $$\begin{bmatrix} e_1 \\ e_2 \\ e_3 \\ e_4 \end{bmatrix} = \begin{bmatrix} a_4 & a_3 & -a_2 & a_1 \\ -a_3 & a_4 & a_1 & a_2 \\ a_2 & -a_1 & a_4 & a_3 \\ -a_1 & -a_2 & -a_3 & a_4 \end{bmatrix} \begin{bmatrix} m_1 \\ m_2 \\ m_3 \\ m_4 \end{bmatrix}$$

where $a_1, a_2, a_3,$ and $a_4$ are Euler parameters of the form of $b_1 \sin u/2$, $b_2 \sin u/2$, $b_3 \sin u/2$, and $\cos u/2$, respectively, representative of the existing attitude of the body, and $m_1, m_2, m_3,$ and $m_4$ are Euler parameters representative of the desired attitude of the body; and then performing the operation indicated by $$\begin{bmatrix} p_x \\ p_y \\ p_z \end{bmatrix} = -2 \begin{bmatrix} e_1 \\ e_2 \\ e_3 \end{bmatrix} \text{sign } (e_4) = p(u)\bar{b} = \bar{p}$$

(j) the calculation recited in (f) thereof is performed by multiplying the results $p_x, p_y,$ and $p_z$, obtained by the calculation described in (i) preceding, by an arbitrary constant $k$;

(k) the calculation recited in (g) thereof is performed by subtracting the results $kp_x, kp_y,$ and $kp_z$ of the calculation recited in (j), preceding, from $w_x, w_y,$ and $w_z$, which are values representative of the components of existing body angular velocity around the body axes represented by their subscripts, to form the differences $w_x-kp_x$, $w_y-kp_y$, and $w_z-kp_z$; and (l) the calculation recited in (h) thereof is performed by carrying out the operation indicated by $$\begin{bmatrix} I_{xx} & I_{xy} & I_{xz} \\ I_{xy} & I_{yy} & I_{yz} \\ I_{xz} & I_{yz} & I_{zz} \end{bmatrix} \begin{bmatrix} w_x-kp_x \\ w_y-kp_y \\ w_z-kp_z \end{bmatrix} = \begin{bmatrix} h_x \\ h_y \\ h_z \end{bmatrix}$$

where $I_{xx}, I_{yy},$ and $I_{zz}$ are the moments of inertia of the body around the axes through its center of mass indicated by the subscripts, and $I_{xy}$ et similes are the products of inertia of the body with respect to the orthogonal planes through the center of mass indicated by the subscripts.

4. In a servo system for controlling the angular position of a controlled device which comprises:

a rotator, connected to the controlled device, whose torque is proportional in magnitude and direction respectively to the magnitude and sign of a control signal applied to the rotator; and a control signal source which produces a first control signal which is applied to the rotator, which first control signal is proportional in amplitude to, and has the same sign as, the sine of the angle between the existing angular position of the controlled device and the desired angular position of the controlled device, the improvement which comprises:

(a) a control signal source which produces a second control signal which is proportional in amplitude to the cosine of the angle between the existing angular position of the controlled device and the desired angular position of the controlled device when and only when such cosine is negative;

(b) sign inversion means connected to receive the said second control signal as an input and responsively thereto to produce as an output a third control signal which is opposite in sign to the said second signal;

(c) switching means connected to sample the sign of the said first control signal and, responsively thereto, to connect the said second control signal additively to the said first control signal when the said first control signal is of the same sign as the second control signal, and to connect the said third control signal additively to the said first control signal when the said first control signal is of the same sign as the third control signal, the signals thus additively connected being applied to the said rotator to control the magnitude and direction of its torque.

References Cited

Daigle, F. F., "Inertial Navigation, Part III—Inertial Stabilization," in R.C.A. Engineer, 5(3); p. 40–43, October-November 1959, TK6546.R121.

MALCOLM A. MORRISON, Primary Examiner

R. S. DILDINE, JR., Assistant Examiner

U.S. Cl. X.R.

33—226 R; 74—5.47